(12) United States Patent
Usui

(10) Patent No.: US 7,304,867 B2
(45) Date of Patent: Dec. 4, 2007

(54) DC-DC CONVERTER OF MULTI-OUTPUT TYPE

(75) Inventor: Hiroshi Usui, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 11/330,811

(22) Filed: Jan. 12, 2006

(65) Prior Publication Data

US 2006/0158908 A1 Jul. 20, 2006

(30) Foreign Application Priority Data

Jan. 14, 2005 (JP) ............... 2005-008160

(51) Int. Cl.
H02M 7/08 (2006.01)
H02H 3/335 (2006.01)
H01F 27/28 (2006.01)

(52) U.S. Cl. ............ 363/21.06; 363/67; 336/183

(58) Field of Classification Search ............ 363/21.04, 363/21.06–21.08, 21.14, 17, 21.02, 21.03, 363/21.12, 16, 67; 307/30, 31, 89; 336/183; 323/267

See application file for complete search history.

(56) References Cited

U.S. PATENT DOCUMENTS

| | | | | |
|---|---|---|---|---|
| 4,500,833 A | * | 2/1985 | Napp et al. ............... | 323/359 |
| 5,363,323 A | * | 11/1994 | Lange ................... | 363/21.09 |
| 5,521,573 A | * | 5/1996 | Inoh et al. ................ | 336/180 |
| 5,973,941 A | * | 10/1999 | Zaim .................... | 363/21.08 |
| 5,986,911 A | * | 11/1999 | Tang ..................... | 363/89 |
| 6,064,291 A | * | 5/2000 | Urabe et al. .............. | 336/222 |
| 6,078,509 A | * | 6/2000 | Jacobs et al. ............ | 363/21.18 |
| 6,304,461 B1 | * | 10/2001 | Walker ................... | 363/17 |
| 6,504,267 B1 | * | 1/2003 | Giannopoulos ............ | 307/31 |
| 6,504,270 B1 | * | 1/2003 | Matsushita .............. | 307/140 |
| 6,760,233 B2 | * | 7/2004 | Tolle et al. ............... | 363/16 |

FOREIGN PATENT DOCUMENTS

| | | | |
|---|---|---|---|
| DE | 0 698 959 | * | 9/1996 |
| JP | 3-7062 | | 1/1991 |

\* cited by examiner

Primary Examiner—Karl Easthom
Assistant Examiner—Harry Behm
(74) Attorney, Agent, or Firm—Bachman & LaPointe, P.C.

(57) ABSTRACT

A DC-DC converter of multi-output type is provided wherein a primary winding $5a$ is wound around core halves $5g$, $5h$ of a transformer 5 between first and second secondary windings $5b$, $5c$ of transformer 5 also concentrically wound around core halves $5g$, $5h$ to form an electromagnetic sparse coupling between first and second secondary windings $5b$, $5c$. When on-off operation of first and second primary MOS-FETs 2, 3 generates first and second DC outputs $V_{O1}$, $V_{O2}$, the electromagnetic sparse coupling can reduce, attenuate or relax serge voltage induced on first secondary winding $5b$. This restrains or controls potential increase in first output voltage $V_{O1}$ resulted from serge voltage through first rectifying smoother 9 under the light- or no-load condition to control fluctuation in second output voltage $V_{O2}$ through second rectifying smoother 17 without restricting transmission of electric power from the primary to the secondary side making use of feedback control to primary control circuit 14 in order to generate stable first and second DC output voltages $V_{O1}$ and $V_{O2}$ throughout the entire loaded and unloaded range.

9 Claims, 6 Drawing Sheets

(A) Low input voltage E (B) High input voltage E (C) Under light–load condition (D) Under heavy–load condition

DC-DC CONVERTER OF MULTI-OUTPUT TYPE

TECHNICAL FIELD

This invention relates to a DC-DC converter of multi-output type capable of producing a plurality of outputs, in particular, stable outputs throughout the entire loaded and unloaded range.

BACKGROUND OF THE INVENTION

A DC-DC converter of multi-output type comprises a switching element and a resonance circuit provided on a primary side of a transformer to turn on and off the switching element in order to produce a plurality of outputs from a plurality of secondary windings of transformer through rectifying smoothers. Such DC-DC converters have been widely applied to inexpensive power sources for information processing appliances such as personal computers, and household electric appliances such as air-conditioners or audio or visual equipments.

For example, a prior art DC-DC converter of multi-output type shown in FIG. 1 comprises first and second primary MOS-FETs 2 and 3 as first and second primary switching elements connected in series to a DC power source 1; a series circuit which includes a capacitor 4, an inductance 5d and a primary winding 5a of a transformer 5 connected in series to one another and in parallel to second primary MOS-FET 3; a pseudo voltage resonance capacitor 6 connected between drain and source terminals of first primary MOS-FET 2; a first rectifying smoother 9 which includes a first output rectifying diode 7 and a first output smoothing capacitor 8; a first output voltage detector 12 for outputting an error signal $V_{E1}$, a difference between first DC output voltage $V_{O1}$ and a limitary reference voltage (not shown) for regulating a value of first output voltage $V_{O1}$; a primary control circuit 14 for controlling the on-off operation of first and second primary MOS-FETs 2 and 3 based on error signal $V_{E1}$ forwarded from first output voltage detector 12 to an input terminal FB of primary control circuit 14 as a feedback signal through light emitter 13a and light receiver 13b of a photocoupler 13; a second rectifying smoother 17 which includes a second output rectifying diode 15 and an output smoothing capacitor 16; an output control MOS-FET 20 as a secondary switching element connected between second output rectifying diode 15 and a second output smoothing capacitor 16 of second rectifying smoother 17; and a secondary control circuit 21 for controlling the on-off operation of output control MOS-FET 20 based on second output voltage $V_{O2}$ from second rectifying smoother 17. A first secondary winding 5b of transformer 5 is connected between first output rectifying diode 7 and smoothing capacitor 8 so that first rectifying smoother 9 produces a first DC output voltage $V_{O1}$ from first output terminals 10 and 11. A second secondary winding 5c of transformer 5 is connected between second output rectifying diode 15 and smoothing capacitor 16 so that second rectifying smoother 17 produces a second DC output voltage $V_{O2}$ from second output terminals 18 and 19.

As shown in FIG. 2, transformer 5 comprises a pair of E-shaped core halves 5g and 5h formed of magnetic sintered compact such as ferrite, each core half 5g, 5h having a pair of outer legs 5i and 5j and an intermediate leg 5k; a plastic bobbin 5l formed with a cylindrical portion 5m and a pair of flanges 5n at the opposite ends of cylindrical portion 5m; insulating barrier tapes 5p wound around bobbin 5l adjacent to flanges 5n; primary winding 5a and first and second secondary windings 5b and 5c concentrically wound around intermediate legs 5k of core halves 5g and 5h between barrier tapes 5p; and insulating tapes 5q for electrically insulating between primary winding 5a and first secondary windings 5b and between primary winding 5a and second secondary winding 5c. Intermediate legs 5k of E-shaped core halves 5g and 5h are positioned in cylindrical portion 5m of bobbin 5l. Primary, first and second secondary windings 5a, 5b and 5c are coaxially wound in the form of a layered structure around cylindrical portion 5m of bobbin 5l in the outward order of primary, second and first secondary windings 5a, 5c and 5b. Insulating tape 5q is inserted between primary and second secondary windings 5a and 5c to form a fully or slightly electromagnetic sparse coupling between primary and first secondary winding 5a and 5b and between primary and second secondary winding 5a and 5c while forming electromagnetic close coupling between first and second secondary windings 5b and 5c wound adjacent to each other. As a result, this arrangement causes transformer 5 of FIG. 2 to have a leakage inductance 5d connected equivalently and in series to primary winding 5a, and an excitation inductance 5e connected equivalently and in parallel to primary winding 5a, while leakage inductance 5d serves as a coil or reactor for current resonance.

As shown in FIG. 3, primary control circuit 14 comprises an oscillation circuit 22 for producing pulse signals $V_{PL}$; an inverter 23 for generating inverted signals $-V_{PL}$ of pulse signals $V_{PL}$ from oscillation circuit 22; a first generator 24 for adding constant dead time to pulse signals $V_{PL}$ from oscillation circuit 22 to provide first drive signals $V_{G1}$; a low side buffer amplifier 25 for applying first drive signals $V_{G1}$ from first generator 24 to a gate terminal of first primary MOS-FET 2; a second generator 26 for adding constant dead time to pulse signals $-V_{PL}$ from inverter 23 to produce second drive signals $V_{G2}$; a level shifter 27 for adjusting the voltage level of second drive signals $V_{G2}$; and a high side buffer amplifier 28 for applying second drive signals $V_{G2}$ from level shifter 27 to a gate terminal of second primary MOS-FET 3. Oscillation circuit 22 receives error signals $V_{E1}$ at input terminal FB as feedback signals from first output voltage detector 12 through photocoupler 13 to produce pulse signals $V_{PL}$ which has a constant pulse width and frequency variable in response to voltage level of error signals $V_{E1}$ from first output voltage detector 12. Accordingly, primary control circuit 14 forwards first and second drive signals $V_{G1}$ and $V_{G2}$ to each gate terminal of first and second primary MOS-FETs 2 and 3, while first drive signals $V_{G1}$ have the fixed or constant on-period of time and the off-period of time variable based on voltage level of error signals $V_{E1}$ from first output voltage detector 12, and second drive signals $V_{G2}$ have the fixed or constant off-period of time and the on-period of time variable based on voltage level of error signals $V_{E1}$ from first output voltage detector 12 to alternately turn first and second primary MOS-FETs 2 and 3 on and off in response to voltage level of error signal $V_{E1}$ from first output voltage detector 12. Specifically, primary control circuit 14 changes the on-period of second primary MOS-FET 3 based on first output voltage $V_{O1}$ from first rectifying smoother 9 to control the on-duty of first primary MOS-FET 2 while maintaining the on-period of first primary MOS-FET 2 fixed.

As shown in FIG. 4, second control circuit 21 comprises a timing detector 29 for sensing a winding voltage $V_{T22}$ produced on second secondary winding 5c of transformer 5 to produce detection signals $V_{TD}$ when first primary MOS-FET 2 is turned on; a second output voltage detector 30 for sensing a second output voltage $V_{O2}$ applied on a second output smoothing capacitor 16 of a second rectifying smoother 17 to produce an error signal $V_{E2}$, a difference between the second output voltage $V_{O2}$ and a limitary reference voltage (not shown) for regulating the value of second output voltage $V_{O2}$; a PWM (Pulse Width Modulation) controller 31 driven by detection signals $V_{TD}$ from timing detector 29 for controlling occurrence cycle of pulse array signals $V_{PT}$ based on error signal $V_{E2}$ from second output voltage detector 30; an RS flip flop 32 which is set by detection signal $V_{TD}$ from timing detector 29 and reset by pulse array signal $V_{PT}$ from PWM controller 31; and a drive circuit 33 for forwarding a second drive signal $V_{S2}$ to a gate terminal of output control MOS-FET 20 when RS flip flop 32 produces the output signal. Thus, output control MOS-FET 20 is synchronously turned on and off with switching frequency or on-period of first primary MOS-FET 2 to control on-period of output control MOS-FET 20 based on second output voltage $V_{O2}$ from second output smoothing capacitor 16 of second rectifying smoother 17.

In operation of DC-DC converter shown in FIG. 1, a main switch not shown is turned on to supply electric power to primary control circuit 14 which is therefore activated to provide first and second drive signals $V_{G1}$ and $V_{G2}$ for gate terminals of first and second primary MOS-FETs 2 and 3 which start to be alternately turned on and off. When first primary MOS-FET 2 is turned on, winding current $I_{Q1}$ flows from DC power source 1 through current resonance capacitor 4, leakage inductance 5d and primary winding 5a of transformer 5, first primary MOS-FET 2 and DC power source 1. Winding current $I_{Q1}$ can roughly be divided into three kind of currents, namely first and second load currents and excitation current. First load current flow passes through current resonance capacitor 4, leakage inductance 5d and primary winding 5a of transformer 5, first primary MOS-FET 2 to induce first secondary current $I_{D1}$ flowing through first secondary winding 5b of transformer 5, first output rectifying diode 7 and first output capacitor 8 of first rectifying smoother 9. Second load current flow runs through current resonance capacitor 4, leakage inductance 5d and primary winding 5a of transformer 5 and first primary MOS-FET 2 to lead second secondary current $I_{D2}$ to flow through second secondary winding 5c of transformer 5, second output rectifying diode 15 and second output smoothing capacitor 16 of second rectifying smoother 17. Excitation current flow goes through current resonance capacitor 4, leakage and excitation inductances 5d and 5e of transformer 5 and first primary MOS-FET 2 to accumulate magnetic energy in transformer 5 by electric energy supplied from leakage and excitation inductances 5d and 5e. Both of first and second load currents $I_{D1}$ and $I_{D2}$ are sine resonance currents of each resonance frequency determined by capacitance of current resonance capacitor 4 and leakage inductance 5d of transformer 5. Excitation current is a resonance current of resonance frequency determined by composite inductance of leakage and excitation inductances 5d and 5e and capacitance of current resonance capacitor 4 so that excitation current is observed as triangle waveform currents whose wave legs are formed by a part of sine wave while resonance frequency is lower than that produced during the on-period of first MOS-FET 2.

Thereafter, when first primary MOS-FET 2 is turned off, magnetic energy accumulated in transformer 5 triggers a voltage pseudo resonance between voltages $V_{Q1}$ and $V_{Q2}$ respectively across first and second primary MOS-FETs 2 and 3 with the resonance frequency determined by the composite inductance of leakage and excitation inductances 5d and 5e and capacitance by pseudo resonance capacitor 6.

Specifically, winding current $I_{Q1}$ flows through first primary MOS-FET 2 turned on, however, the moment MOS-FET 2 is turned off, winding current $I_{Q1}$ is diverted toward capacitor 6. When capacitor 6 is charged by diverted winding current $I_{Q1}$ up to voltage level E of DC power source 1, winding current $I_{Q1}$ further is diverted to an inner diode not shown in second primary MOS-FET 3. In other words, magnetic energy stored in transformer 5 by excitation current is discharged in the form of diverted winding current which flows through inner diode of MOS-FET 3 and capacitor 4 to charge capacitor 4. Accordingly, during the charging period of time for capacitor 4 by diverted winding current, it is possible to attain the turning-on or zero voltage switching (ZVS) of MOS-FET 3.

When full excitation current flows to finish discharge of magnetic energy stored in transformer 5, electric charge accumulated in capacitor 4 causes discharge current to flow from capacitor 4 through second primary MOS-FET 3, excitation and leakage inductances 5e and 5d to capacitor 4 to release electric charge from capacitor 4. This discharge current provides an adverse excitation current flowing through transformer 5 in the opposite direction to that of winding current $I_{Q1}$ flowing during the on-period of first primary MOS-FET 2. The adverse excitation current serves as a resonance current which has the resonance frequency determined by composite inductance of leakage and excitation inductances 5d and 5e and capacitance of current resonance capacitor 4. As this resonance frequency is lower than that produced during the on-period of first MOS-FET 2 so that excitation current is observed as triangle waveform current which is a cyclic current flowing through a path of capacitor 4, MOS-FET 3, excitation and leakage inductances 5e and 5d and capacitor 4.

FIG. 5(A) to 5(D) indicate waveforms of voltage $V_{Q1}$ between drain and source terminals of MOS-FET 2, winding current $I_{Q1}$ passing through MOS-FET 2 and voltage $V_{C2}$ produced across capacitor 4. In detail, FIGS. 5(A) and 5(B) show waveforms of voltages $V_{Q1}$ and $V_{C2}$ and winding current $I_{Q1}$ produced in case of respectively low and high input voltage level E from DC power source 1 with the fixed on-period of MOS-FET 2 and the varied on-period of MOS-FET 3. In other words, FIGS. 5(A) and 5(B) demonstrate the on-duty of first primary MOS-FET 2 controlled by varying the on-period of second primary MOS-FET 3 in response to input voltage level E on the primary side and first DC output voltage $V_{O1}$ on the secondary side controlled by varying voltage $V_{C2}$ produced across current resonance capacitor 4. FIGS. 5(C) and 5(D) show waveforms of voltages $V_{Q1}$ and $V_{C2}$ and winding current $I_{Q1}$ when electric load (not shown) is respectively light and heavy. Specifically, FIG. 5(C) represents generally triangular waveform of winding current $I_{Q1}$ through MOS-FET 2 under the light load condition while almost no resonance or load current flows, on the contrary, FIG. 5(D) represents winding current $I_{Q1}$ through MOS-FET 2 with the partial variation into sine wave while resonance or load current flows. Also, FIGS. 5(C) and 5(D) show that the on-period of first primary MOS-FET 2 is observed when voltage $V_{Q1}$ between drain and source terminals of MOS-FET 2 is at the zero level and that the on-period of first primary MOS-FET 2 does not almost change throughout the light and heavy load conditions to supply electric power from the primary to the secondary side of transformer 5 although load on the secondary side fluctuates, since the on-period of first primary MOS-FET 2, namely the period for supplying electric power from the primary to the secondary side of transformer 5 is determined by resonance frequency given by capacitance of capacitor 4 and inductance of leakage inductance $5d$. Thus, it is possible in the converter to produce necessary DC electric power from second secondary winding $5c$ of transformer 5 through second rectifying smoother 17 independently of fluctuation in load occurred on the side of first secondary winding $5b$ of transformer 5.

FIG. 6 is a graph exhibiting a variation in first DC output voltage $V_{O1}$ on the secondary side with change in the on-period ratio or duty ratio of first MOS-FET 2 to second MOS-FET 3 in prior art DC-DC converter of multi-output type shown in FIG. 1. FIG. 6 displays that first DC output voltage $V_{O1}$ from first output terminals 10 and 11 can be adjusted by changing the on-period ratio of first MOS-FET 2 to second MOS-FET 3 in a range from 0.3 to 1.0. Specifically, the on-period ratio of first and second MOS-FETs 2 and 3 can be varied to adjust charged voltage $V_{C2}$ of current resonance capacitor 4 for control of voltage applied on primary winding $5a$ of transformer 5 so that first DC output voltage $V_{O1}$ from first DC output terminals 10 and 11 can be appropriately regulated.

First output voltage detector 12 picks out first DC output voltage $V_{O1}$ available from first DC output terminals 10 and 11 to produce error signal $V_{E1}$, the differential between output voltage $V_{O1}$ and limitary reference voltage so that error signal $V_{E1}$ is transmitted to input terminal FB of primary control circuit 14 as a feedback signal through light emitter $13a$ and receiver $13b$ of photocoupler 13. Then, primary control circuit 14 prepares first and second drive signals $V_{G1}$ and $V_{G2}$ whose pulse frequencies are modulated (PFM or Pulse Frequency Modulation) based on voltage level of error signal $V_{E1}$ forwarded from first output detector 12 to input terminal FB, and applies them to each gate terminal of first and second MOS-FETs 2 and 3 which are then alternately turned on and off with the operating frequency corresponding to voltage level of error signal $V_{E1}$ from first output detector 12. Specifically, with higher output voltage $V_{O1}$, error signal $V_{E1}$ has the higher voltage level to reduce the operating frequency, thereby causing output voltage $V_{O1}$ to fall down, adversely, with lower output voltage $V_{O1}$, error signal $V_{E1}$ has the lower voltage level to increase the operating frequency, thereby causing the output voltage $V_{O1}$ to rise. In this way, first DC output voltage $V_{O1}$ produced from first output terminals 10 and 11 can be controlled toward and maintained at a substantially constant value.

When first MOS-FET 2 is turned on, a voltage is generated on primary winding $5a$ of transformer 5 to simultaneously induce voltage $V_{T22}$ on second secondary winding $5c$ of transformer 5, second rectifying smoother 17 and timing detector 29 in secondary control circuit 21. At the moment, timing detector 29 delivers detection signal $V_{TD}$ of high voltage level to set terminal S of RS flip flop 32 and PWM control circuit 31 to set RS flip flop 32 and drive PWM control circuit 31. Accordingly, RS flip flop 32 produces from output terminal Q the output signal to drive circuit 33 which in turn provides secondary drive signal $V_{S2}$ of high voltage level for gate terminal of output control MOS-FET 20 to turn on MOS-FET 20. This causes current flow $I_{D2}$ to run from second secondary winding $5c$ of transformer 5 through second output rectifying diode 15 to second output smoothing capacitor 16 of second rectifying circuit 17 to charge capacitor 16 and raise output voltage $V_{O2}$.

When output control MOS-FET 20 is turned on, voltage $V_{T22}$ on second secondary winding $5c$ is clamped with voltage $V_{O2}$ of smoothing capacitor 16 to apply on leakage inductance $5d$, the differential voltage deducted the voltage equivalent to turn ratio of primary and second secondary windings $5a$ and $5c$ from voltage applied on leakage and excitation inductances $5d$ and $5e$ of transformer 5. In the exemplified DC-DC converter illustrated in FIG. 1, leakage inductance $5d$ of transformer 5 can serve to absorb unnecessary potential component of output voltage. Subsequently, output control MOS-FET 20 is turned off to release voltage clamp on second secondary winding $5c$ so that produced on first secondary winding $5b$ is a common voltage which is clamped with first output voltage $V_{O1}$ on first output smoothing capacitor 8. Thus, during the on-period of first primary MOS-FET 2, current flow $I_{D2}$ runs through second output rectifying diode 15 of second rectifying smoother 17, and after turning off of output control MOS-FET 20, current flow $I_{D1}$ runs through first output rectifying diode 7 of first rectifying smoother 9. In case there is little potential difference between first and second DC output voltages $V_{O1}$ and $V_{O2}$, current flows $I_{D1}$ and $I_{D2}$ may simultaneously pass through respectively first and second output rectifying diodes 7 and 15 by ripple voltages from respectively first and second output rectifying capacitors 8 and 16. Here, FIGS. 7(A) to 7(G) represent waveforms of voltage $V_{Q2}$ between source and drain terminals of second primary MOS-FET 3, current flow $I_{Q2}$ through second primary MOS-FET 3, voltage $V_{Q1}$ between drain and source terminals of first MOS-FET 2, current flow $I_{Q1}$ through first MOS-FET 2, current flow $I_{D1}$ through first output rectifying diode 7, current flow $I_{D2}$ through second output rectifying diode 15 and voltage $V_{C2}$ produced across current resonance capacitor 4.

Meanwhile, second output voltage detector 30 in secondary control circuit 21 senses second output voltage $V_{O2}$ across second output smoothing capacitor 16 of second rectifying smoother 17 so that second detector 30 prepares error signal $V_{E2}$ between detection signal $V_{O2}$ and limitary reference voltage, and forwards error signal $V_{E2}$ to PWM control circuit 31. Driven by detection signal $V_{TD}$ of high voltage level supplied from timing detector 29 is PWM control circuit 31 which outputs pulse array signal $V_{PT}$ to reset terminal of RS flip flop 32 and thereby controls duty ratio of pulse array signal $V_{PT}$ based on voltage level of error signal $V_{E2}$ from second output voltage detector 30. In detail, when second output voltage $V_{O2}$ from second output smoothing capacitor 16 is higher than reference voltage, PWM control circuit 31 produces pulse array signal $V_{PT}$ of small duty ratio, on the contrary, when second output voltage $V_{O2}$ is lower than reference voltage, PWM control circuit 31 produces pulse array signal $V_{PT}$ of large duty ratio. Accordingly, when second DC output voltage $V_{O2}$ is above a set value, PWM control circuit 31 produces pulse array signal $V_{PT}$ of small duty ratio to reset terminal R of RS flip flop 32 to apply secondary drive signal $V_{S2}$ of narrow pulse width from output terminal Q of RS flip flop 32 through drive circuit 33 to gate terminal of output control MOS-FET 20. Secondary drive signal $V_{S2}$ of narrow pulse reduces the on-period of output control MOS-FET 20 to terminate early on or shorten the period for allowing charge current to flow into second output smoothing capacitor 16, thus lowering second output voltage $V_{O2}$ from second output smoothing capacitor 16. On the contrary, when second DC output voltage $V_{O2}$ is below the set value, PWM control circuit 31 produces pulse array signal $V_{PT}$ of large duty ratio to reset terminal R of RS flip flop 32 to apply secondary drive signal $V_{S2}$ of wide pulse width from output terminal Q of RS flip flop 32 through drive circuit 33 to gate terminal of output control MOS-FET 20. Secondary drive signal $V_{S2}$ of wide pulse extends the on-period of output control MOS-FET 20 to terminate late or widen the period for allowing charge current to flow into second output smoothing capacitor 16, thus boosting second output voltage $V_{O2}$ from second output smoothing capacitor 16. In this way, the on-period of output control MOS-FET 20 can be controlled based on second output voltage $V_{O2}$ from second rectifying smoother 17 synchronously with the on-period of first primary MOS-FET 2 to adjust second DC output voltage $V_{O2}$ between second output terminals 18 and 19 to a substantially constant value.

Japanese Patent Disclosure No. 3-7062 exhibits a switching power source of resonance type which comprises a frequency modulator for performing frequency modulation of reference pulse signals to produce pulse array signals; a power transistor on the primary side to be turned on and off by pulse array signals for controlling voltage applied on a primary winding of a transformer; a plurality of secondary windings electromagnetically connected to the transformer; and a rectifying smoother for rectifying and smoothing an output from each secondary winding. In this switching power source, a comparator as a primary control means controls frequency of pulse array signals delivered from frequency modulator in response to output signals from a predetermined rectifying smoother on the secondary side. Also, a secondary switching transistor is turned on and off by secondary control circuit in response to outputs from a secondary winding through a rectifying smoother to control the duty cycle in pulse array voltage produced on the output side of the secondary switching transistor. Controlling the duty cycle thins an appropriate amount of pulse array voltage produced on the output side of secondary switching transistor to adjust DC output voltages from secondary windings through rectifying smoothers.

On the other hand, Japanese Patent Disclosure No. 2000-295847 demonstrates a transformer for switching power source or inverter which comprises a core, and primary, first secondary and second secondary windings wound in the outward order around the core with an insulating paper between first and second secondary windings. In this transformer, leakage inductance in second secondary winding is greater than that in first secondary winding to reduce ripple current during the switching operation. Also, as magnitude of surge voltage is proportional to ramp of ripple current, inclination of winding current becomes greater when larger ripple current occurs, thereby causing possible larger surge voltage and considerable voltage fluctuation to appear on first secondary winding. In this view, first secondary winding serves to provide a power source for generating drive voltages to such as main switching elements or motor of cooling fan relatively resistible against noise. On the other hand, as small surge voltage occurs on second secondary winding due to the small ripple current, second secondary winding serves to provide a stabler power source with little voltage fluctuation for controllers or interfaces susceptible to surge voltage. Although large surge voltage may occur on first secondary winding, electric power can be transmitted from the primary side to first secondary winding with high transmission efficiency due to the small leakage inductance. As mentioned above, in the converter shown in FIG. 1, electric powers can be obtained from each of secondary windings for suitable applications in view of magnitude of their leakage inductances with higher transmission efficiency than that in a transformer having secondary windings all of which involve large leakage inductance. The converter also is advantageous in that it has a simplified structure of filter circuits to provide an inexpensive power source.

However, prior art DC-DC converter shown in FIG. 1 or switching power source described in Japanese Patent Disclosure No. 3-7062 are defective in that they may involve serge voltage arisen on second secondary winding 5c from inductance of second secondary winding 5c when output control MOS-FET 20 is turned off, since second output current $I_{D2}$ intermittently flows through second secondary winding 5c of transformer 5 by turning on and off of secondary output control MOS-FET 20. In addition, as shown in FIG. 2 or in Japanese Patent Disclosure No. 2000-295847, in some cases, first and second secondary windings 5b and 5c are concentrically wound adjacently to each other through insulating paper to form an electromagnetically close coupling between first and second secondary windings 5b and 5c so that serge voltage occurred on second secondary winding 5c leads to induce associated serge voltage on first secondary winding 5b. In particular, when first secondary winding 5b is connected to load through first DC output terminals 10 and 11 under the light- or no-load condition, electric energy supplied to load may include relatively indispensable amount of serge voltage to increase first output voltage $V_{O1}$ through first rectifying smoother 9 by the amount equivalent to serge voltage. First output voltage detector 12 picks out increased first output voltage $V_{O1}$ and transmits it as a feedback signal to input terminal FB of primary control circuit 14 through photocoupler 13 so that primary control circuit 14 controls the on-period of first and second primary MOS-FETs 2 and 3 to restrict electric power supplied from primary to secondary side. For example, primary control circuit 14 controls the on-period of first and second primary MOS-FETs 2 and 3 based on feedback signal to input terminal FB to make first output voltage $V_{O1}$ generated on first secondary winding 5b decrease by increased amount resulted from serge voltage so as to still return and keep first DC output voltage $V_{O1}$ at a constant level. On the other hand, second DC output voltage $V_{O2}$ between second DC output terminals 18 and 19 is diminished accordingly by an equivalent amount to decreased voltage in first secondary winding 5b. In this way, the prior art converter is disadvantageous in that second DC output voltage $V_{O2}$ is inconveniently made step-down or fluctuant upon occurrence of serge voltage under the light- or no-load condition, and this unstable output voltage obviously impedes ideal cross-regulation to all DC outputs.

An object of the present invention is to provide a DC-DC converter of multi-output type capable of producing a plurality of stable outputs throughout the entire loaded and unloaded range.

SUMMARY OF THE INVENTION

The DC-DC converter of multi-output type according to the present invention comprises: first and second primary switching elements (2, 3) connected in series to a DC power source (1); a first rectifying smoother (9) connected to a first secondary winding (5b) of transformer (5); a primary control circuit (14) for controlling on-off operation of first and second primary switching elements (2, 3) based on output voltage from first rectifying smoother (9); a second rectifying smoother (17) connected to a second secondary winding (5c) of transformer (5); a secondary switching element (20) connected between second secondary winding (5c) and a smoothing capacitor (16) of second rectifying smoother (17); and a secondary control circuit (21) for controlling on-off operation of secondary switching element (20) based on second DC output voltage ($V_{O2}$) from smoothing capacitor (16). On-off operation of first and second primary switching elements (2, 3) generates first and second DC outputs ($V_{O1}$, $V_{O2}$) which can be taken respectively from first and second secondary windings (5b, 5c) of transformer (5) through first and second rectifying smoothers (9, 17).

The moment first or second primary switching element (2, 3) is turned on or when a predetermined period of time elapses after first or second primary switching element (2, 3) is turned on, secondary switching element (20) is turned on to produce electric current flowing through second secondary winding (5c). When secondary switching element (20) is turned off under this condition, serge voltage occurs due to inductance of second secondary winding (5c), and associated serge voltage is induced on first secondary winding (5b). When first rectifying smoother (9) is connected to load under the light- or no-load condition, first output voltage ($V_{O1}$) rises by the amount of serge voltage. In this case, first and second secondary windings (5b, 5c) of transformer (5) are in the electromagnetic sparse coupling which can reduce, attenuate or relax serge voltage induced on first secondary winding (5b). This restrains or controls potential increase in first output voltage ($V_{O1}$) resulted from serge voltage through first rectifying smoother (9) under the light- or no-load condition to control fluctuation in second output voltage ($V_{O2}$) through second rectifying smoother (17) without restricting transmission of electric power from the primary to the secondary side making use of feedback control to primary control circuit (14) although serge voltage appears under the light- or no-load condition. Accordingly, the converter according to the present invention can generate stable first and second DC output voltages ($V_{O1}$, $V_{O2}$) throughout the entire loaded and unloaded range.

BRIEF DESCRIPTION OF THE DRAWINGS

The above-mentioned and other objects and advantages of the present invention will be apparent from the following description in connection with preferred embodiment shown in the accompanying drawings wherein.

BEST MODE FOR CARRYING OUT THE INVENTION

Embodiments of the DC-DC converter according to the present invention will be described hereinafter in connection with FIGS. 8 to 11 of the drawings. Same reference symbols as those shown in FIGS. 1 to 7 are applied to similar portions in these drawings, omitting explanation therefor.

Figure 1:
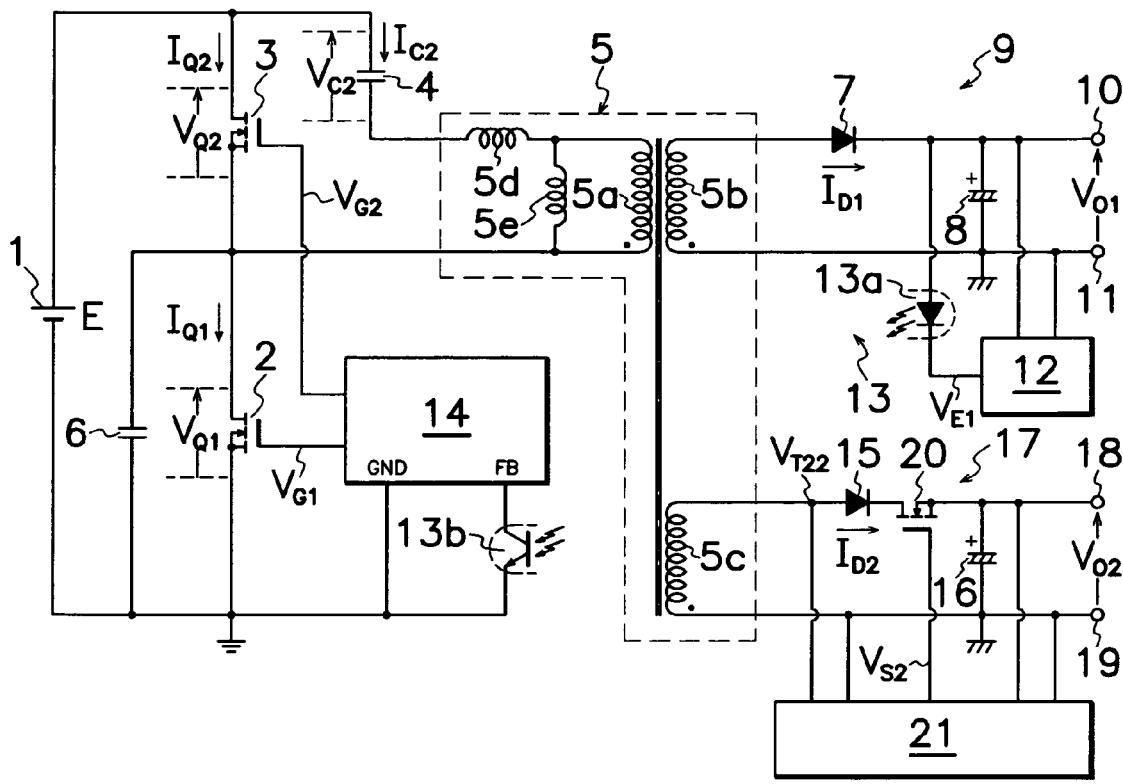
FIG. 1 is an electric circuit diagram of a prior art DC-DC converter of multi-output type.
Figure 2:
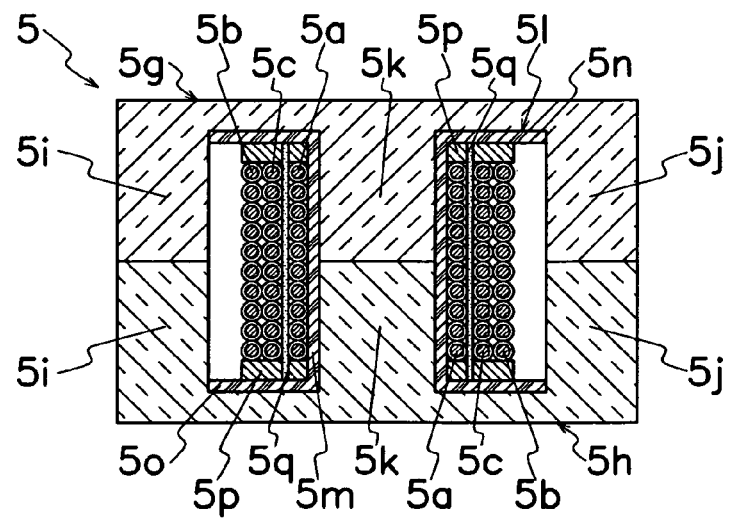
FIG. 2 is a cross-sectional view of a transformer used in the converter shown in FIG. 1.
Figure 3:
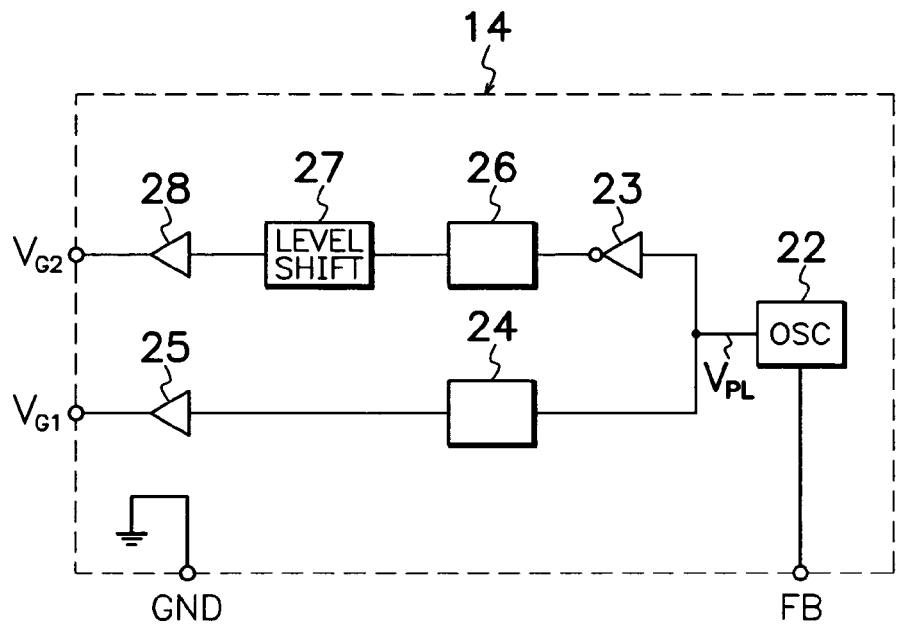
FIG. 3 is an electric circuit diagram of a primary control circuit shown in FIG. 1.
Figure 4:
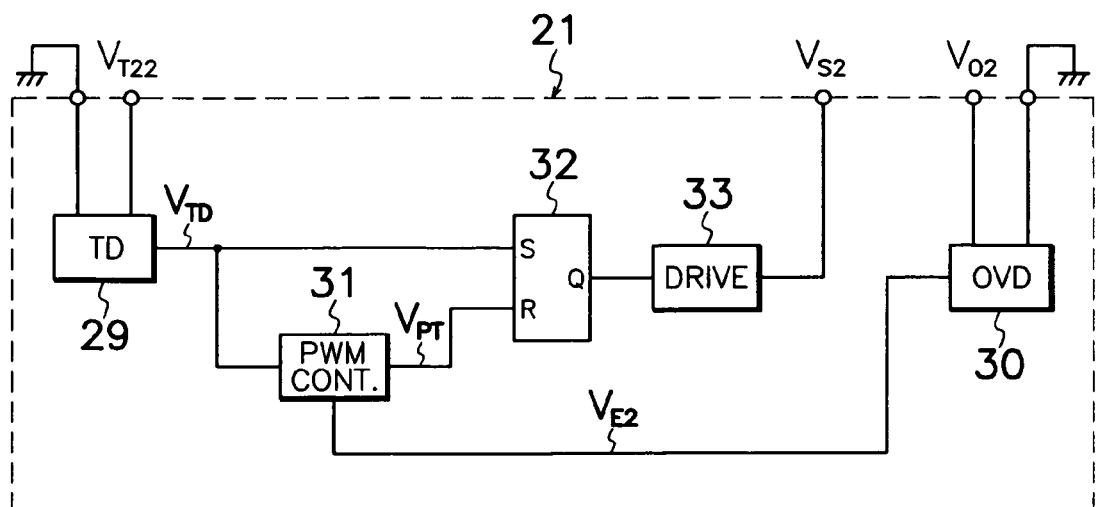
FIG. 4 is an electric circuit diagram of a secondary control circuit shown in FIG. 1.
Figure 5:
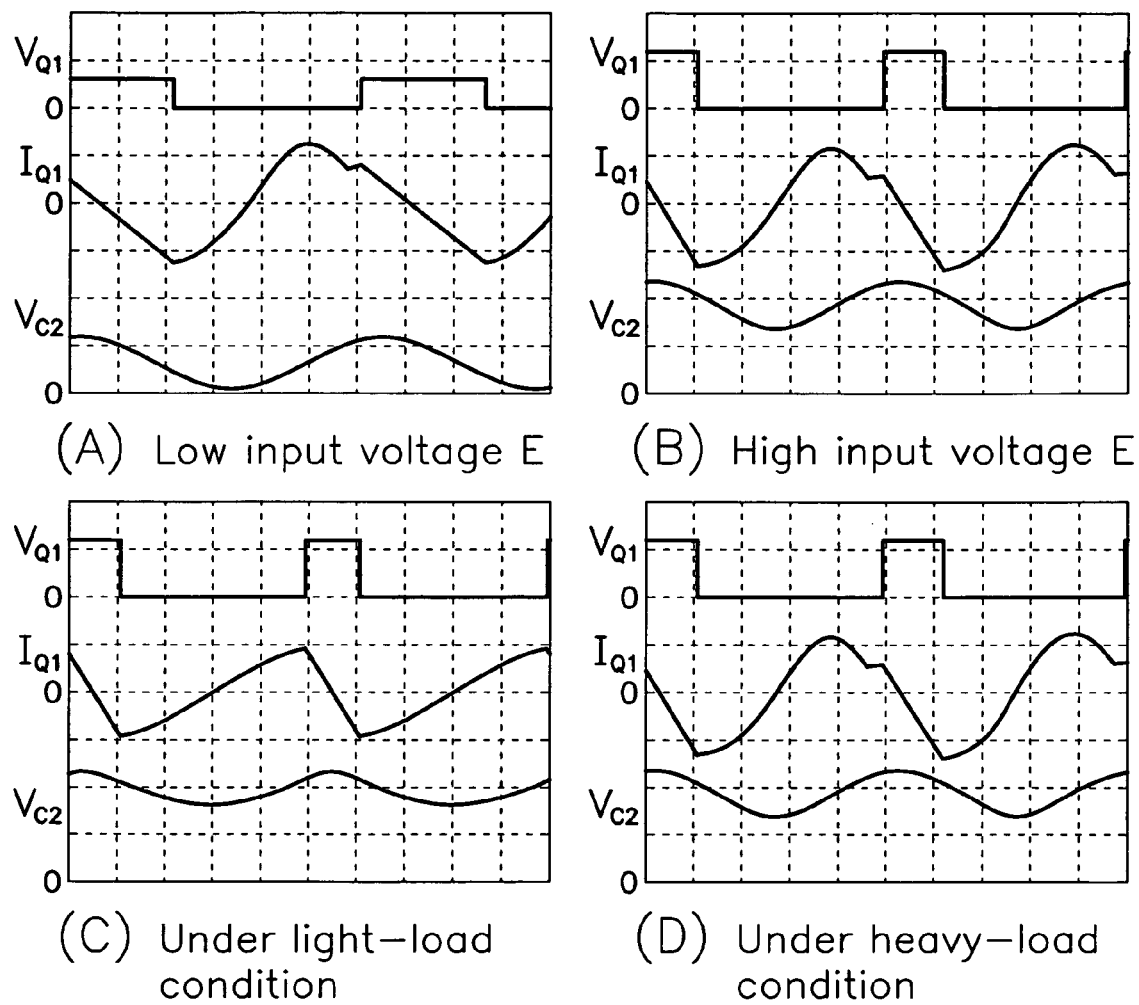
FIG. 5 shows graphs indicating varying waveforms of voltages and currents at locations in the electric circuit shown in FIG. 1 with changes in input voltage and load.
Figure 6:
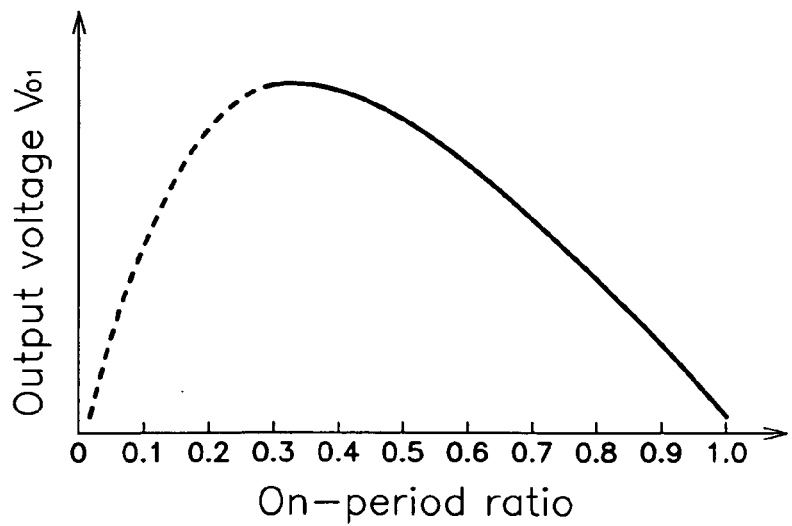
FIG. 6 is a graph exhibiting a relationship of the on-period ratio between primary MOS-FETs with voltage of a first DC output in the electric circuit shown in FIG. 1.
Figure 7:
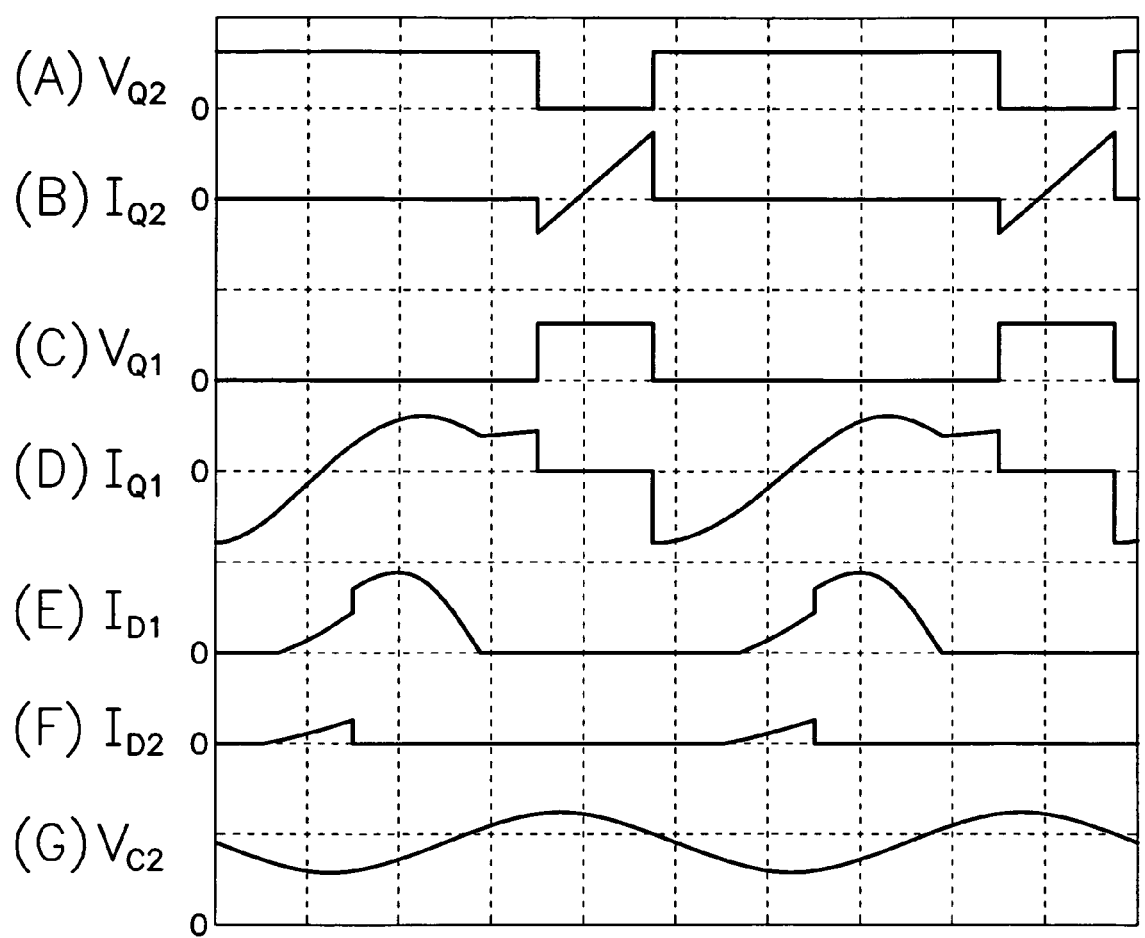
FIG. 7 shows graphs indicating waveforms of voltages and currents at locations in the electric circuit shown in FIG. 1.
Figure 8:
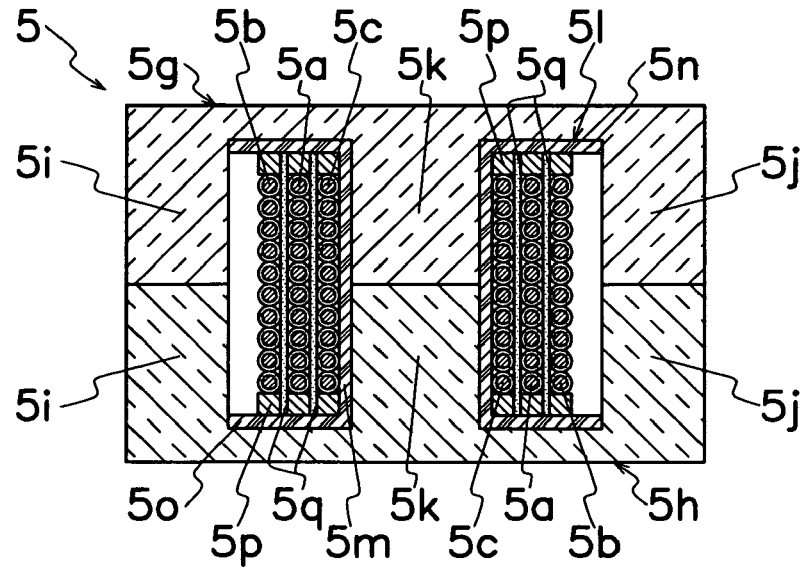
FIG. 8 is a cross-sectional view of a transformer used in the converter shown in FIG. 1 to form a first embodiment of the DC-DC converter of multi-output type according to the present invention.

FIG. 8 is a cross-sectional view of a transformer which is substituted for the prior art transformer shown in FIG. 2 to form a first embodiment of the DC-DC converter of multi-output type according to the present invention in the converter circuit shown in FIG. 1. The transformer 5 shown in FIG. 8 includes second secondary winding 5c, primary winding 5a and first secondary winding 5b concentrically wound in the outward order around a cylindrical portion 5m between a pair of flanges 5n and 5o of a bobbin 5l in a layered structure, and cylindrical insulating papers 5q are also coaxially interposed between second secondary winding 5c and primary winding 5a and between primary winding 5a and first secondary winding 5b. Columnar intermediate legs 5k formed with E-shaped core halves 5g and 5h are positioned in cylindrical portion 5m of bobbin 5l. This arrangement can attain the reduction in the magnetic flux interlinkage number between first and second secondary windings 5b and 5c to accomplish the mutual electromagnetic sparse coupling between first and second secondary windings 5b and 5c since first and second secondary windings 5b and 5c are wound around intermediate legs 5k of E-shaped core halves 5g and 5h through primary winding 5a. Other parts and construction in FIG. 8 are substantially similar to those in FIG. 2, and basic circuitry and its operation of the DC-DC converter with the transformer 5 shown in FIG. 8 are similar to those in prior art DC-DC converter shown in FIG. 1.

In the first embodiment, the moment first primary MOS-FET 2 is turned on or when a predetermined period of time elapses after first primary MOS-FET 2 is turned on, second output current $I_{D2}$ flows through second secondary winding 5c by turning on secondary output control MOS-FET 20. Under this situation, when output control MOS-FET 20 is turned off, inductance in second secondary winding 5c produces serge voltage which concurrently induces associated serge voltage on first secondary winding 5b. If first DC output terminals 10 and 11 are connected to a light- or no-load or in an open circuit, first rectifying smoother 9 raises first output voltage $V_{O1}$ by an equivalent amount to the serge voltage. In transformer 5 shown in FIG. 8, primary winding 5a inserted between first and second secondary windings 5b and 5c defines a field gap or space and therefore provides an electromagnetically thin coupling between first and second secondary windings 5b and 5c to lower the degree of combination in electromagnetic field so that the field gap reduces, attenuates or relaxes serge voltage induced on first secondary winding 5b by the increment in voltage produced on second secondary winding 5c. Thus, the transformer 5 shown in FIG. 8 can suppress a potential rise in first output voltage $V_{O1}$ caused by serge voltage during the light- or no-loading to subdue variation in second output voltage $V_{O2}$ without restricting transmission of electric power from the primary to the secondary side of transformer 5 making use of feedback control to primary control circuit 14 although serge voltage appears under the light- or no-load condition. Accordingly, the converter according to this embodiment can generate stable first and second DC output voltages $V_{O1}$ and $V_{O2}$ throughout the entire loaded and unloaded range and acquire ideal cross-regulation to all DC outputs.

DC-DC converter shown in FIG. 1 may be modified to perform other different embodiments of the present invention. For example, FIG. 9 discloses a second embodiment of the invention which additionally comprises a third secondary winding 5f in transformer 5; a third rectifying smoother 36 which includes a third output rectifying diode 34 and a third output smoothing capacitor 35 connected to third secondary winding 5f; an additional output control MOS-FET 39 connected between a cathode of third output rectifying diode 34 and third output smoothing capacitor 35; and an additional secondary control circuit 40 connected to third DC output terminals 37 and 38 and additional output control MOS-FET 39 for controlling the on-off operation of additional output control MOS-FET 39 based on the level of a third output voltage $V_{O3}$ applied on third output smoothing capacitor 35. Other parts and construction in FIG. 9 are substantially similar to those in FIG. 1, and basic circuitry and its operation of the DC-DC converter with the transformer 5 shown in FIG. 9 are similar to those in prior art DC-DC converter shown in FIG. 1.

Figure 9:
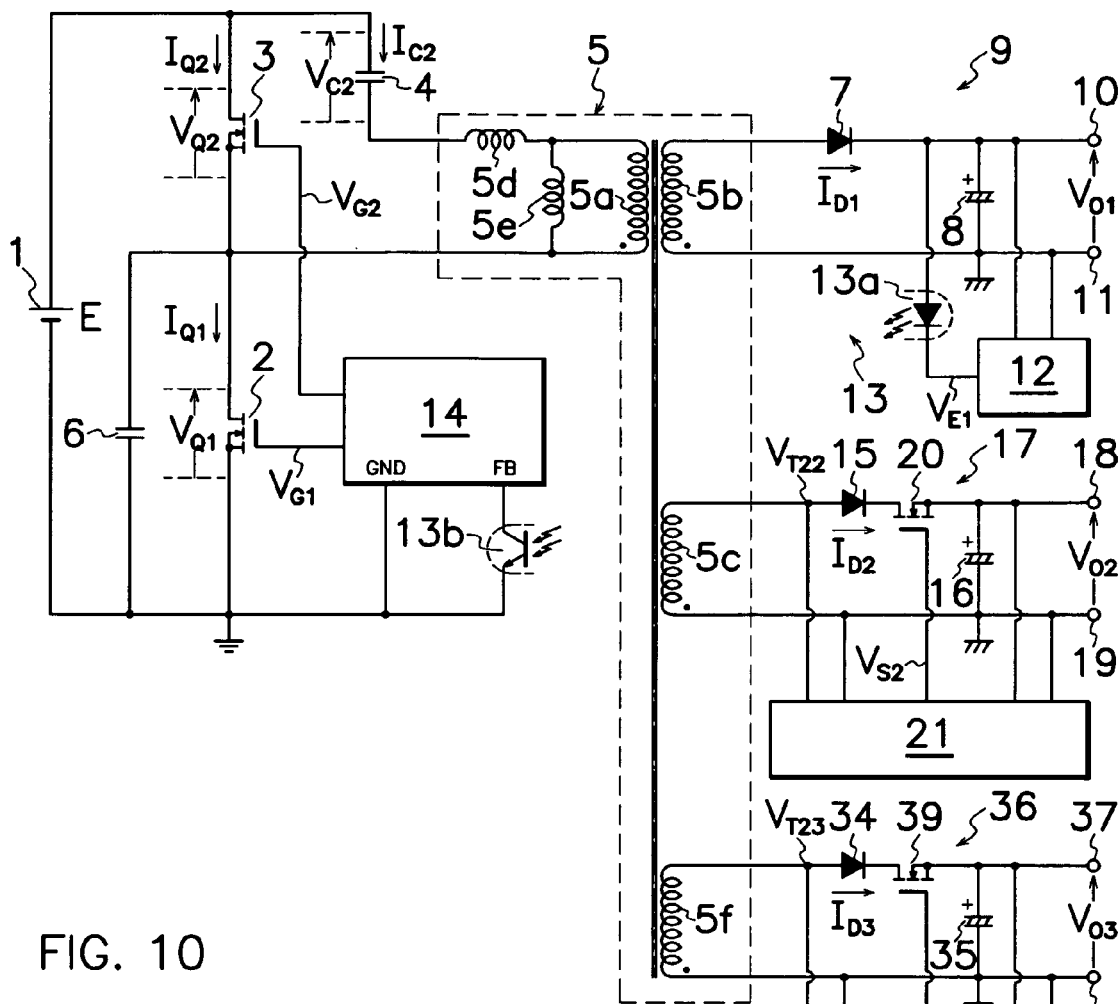
FIG. 9 is an electric circuit diagram of a second embodiment of the DC-DC converter according to the present invention.
Figure 10:
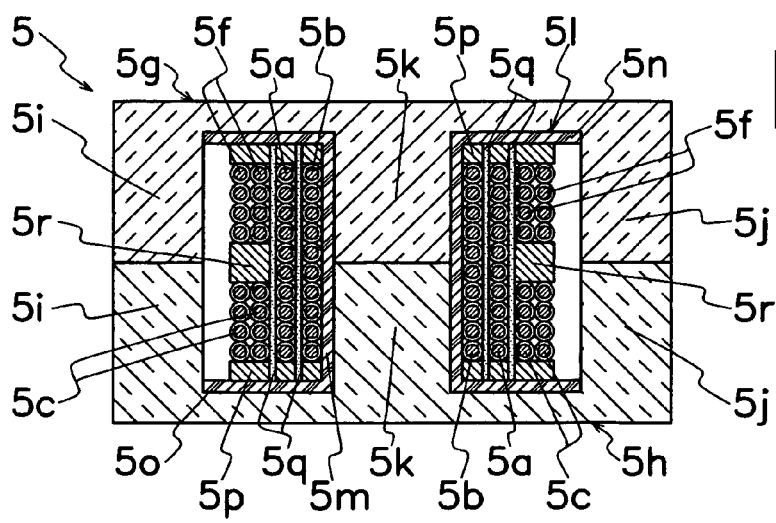
FIG. 10 is a cross-sectional view of a transformer used in the converter shown in FIG. 9.

Used in DC-DC converter of multi-output type shown in FIG. 9 is transformer 5 which as shown in FIG. 10 comprises a first secondary winding 5b, a primary winding 5a, and second and third secondary windings 5c and 5f homocentrically wound in the outward order around a cylinder 5m between a pair of flanges 5n and 5o of a bobbin 5l in a layered structure. Cylindrical interlayer tapes 5q are interposed in gaps or spaces between first secondary and primary windings 5b and 5a and between primary and second secondary windings 5a and 5c. A ring barrier tape 5r is positioned in a space between second and third secondary windings 5c and 5f. Each intermediate leg 5k of E-shaped core halves 5g and 5h are positioned in an inner chamber of cylindrical portion 5m of bobbin 5l around which primary, first to third secondary windings 5a, 5b, 5c and 5f are concentrically wound. In this transformer 5, primary winding 5a is wound around legs 5k in a gap or space between first secondary winding 5b and second and third secondary windings 5c and 5f to reduce the magnetic flux interlinkage number and thereby accomplish the mutual electromagnetic sparse coupling between first and second secondary windings 5b and 5c and between first and third secondary windings 5b and 5f. Also, positioned in a space between second and third secondary windings 5c and 5f is barrier tape 5r which therefore provides the thin electromagnetic connection between second and third secondary windings 5c and 5f. Other parts and construction in FIG. 10 are substantially similar to those in FIG. 2.

Similarly to the arrangement shown in FIG. 8, in transformer 5 according to the second embodiment shown in FIG. 10, the moment first primary MOS-FET 2 is turned on or when a predetermined period of time elapses after first primary MOS-FET 2 is turned on, second and third output currents $I_{D2}$ and $I_{D3}$ flow respectively through second and third secondary windings 5c and 5f by turning on secondary output control MOF-FETs 20 and 39. Under this situation, when output control MOS-FETs 20 and 39 are turned off, inductances in second and third secondary windings 5c and 5f produce serge voltage which concurrently induces associated serge voltage on first secondary winding 5b. When first DC output terminals 10 and 11 are connected to a light- or no-load or in an open circuit, first rectifying smoother 9 elevates first output voltage $V_{O1}$ by an amount of the serge voltage. In transformer 5 shown in FIG. 10, primary winding 5a inserted between first and second secondary windings 5b and 5c defines field gaps or spaces between first and second secondary windings 5b and 5c and between first and third secondary windings 5b and 5f to provide electromagnetically sparse couplings between them. These field gaps allow the lowered degree of combination in electromagnetic field to reduce, attenuate or relax serge voltage induced on first secondary winding 5b by the increment in voltage produced on second and third secondary windings 5c and 5f. Thus, the transformer 5 shown in FIG. 10 can suppress a potential rise in first output voltage $V_{O1}$ caused by serge voltage during the light- or no-loading to prevent fluctuation in second and third output voltages $V_{O2}$ and $V_{O3}$ through second and third rectifying smoothers 17 and 36 without restricting transmission of electric power from the primary to the secondary side of transformer 5 making use of feedback control to primary control circuit 14 although serge voltage appears under the light- or no-load condition. Accordingly, like the first embodiment of FIG. 8, the converter according to this second embodiment of FIG. 10 can also generate stable first, second and third DC output voltages $V_{O1}$, $V_{O2}$ and $V_{O3}$ throughout the entire loaded and unloaded range to acquire ideal cross-regulation to all DC outputs.

Figure 11:
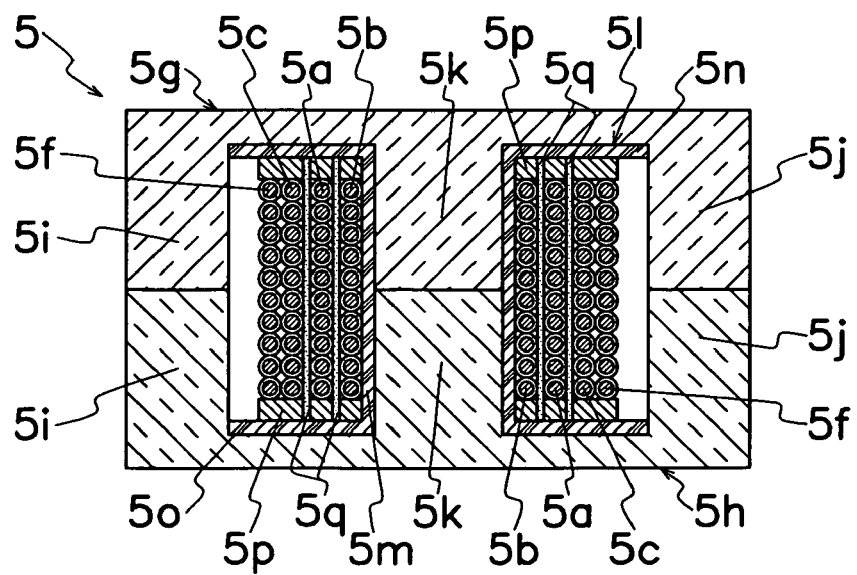
FIG. 11 is a cross-sectional view of a transformer used in the converter shown in FIG. 9 to form a third embodiment of the DC-DC converter according to the present invention.

FIG. 11 illustrates a transformer 5 used for a third embodiment according to the present invention which comprises a first secondary winding 5b wound around cylindrical portion 5m of bobbin 5l between a pair of flanges 5n and 5o, a primary winding 5a wound over first secondary winding 5b through a first interlayer tape 5q, a second secondary winding 5c wound over primary winding 5a through a second interlayer tape 5q, a third secondary winding of wound over second secondary winding 5c, and a pair of E-shaped core halves 5g and 5h whose intermediate legs 5k are positioned in an inner chamber of cylindrical portion 5m of bobbin 5l. Thus, mediately wound around intermediate legs 5k between first and second, third secondary windings 5b and 5c, 5f is primary winding 5a which diminishes the magnetic flux interlinkage number between first and second secondary windings 5b and 5c and between first and third secondary windings 5b and 5f to thereby accomplish the mutual electromagnetic sparse coupling between them. In contrast, electromagnetically close coupling is established between second and third secondary windings 5c and 5f disposed adjacently to each other. Other parts and construction in FIG. 11 are substantially similar to those in FIG. 10.

Like the converter shown in FIG. 10, the arrangement shown in FIG. 11 utilizes primary winding 5a which defines gaps between first and second secondary windings 5b and 5c and between first and third secondary windings 5b and 5f to provide electromagnetically sparse linkages between them and thereby lower the degree of combination in electromagnetic field in order to reduce, attenuate or relax serge voltage induced on first secondary winding 5b by those produced on second and third secondary windings 5c and 5f. Thus, the transformer 5 shown in FIG. 11 can suppress a potential rise in first output voltage $V_{O1}$ from first rectifying smoother 9 caused by serge voltage during the light- or no-loading to prevent fluctuation in second and third output voltages $V_{O2}$ and $V_{O3}$ through second and third rectifying smoothers 17 and 36 without restricting transmission of electric power from the primary to the secondary side of transformer 5 utilizing feedback control to primary control circuit 14 although serge voltage appears under the light- or no-load condition. In this way, similarly to the second embodiment of FIG. 10, the converter according to this third embodiment of FIG. 11 can generate stable first, second and third DC output voltages $V_{O1}$, $V_{O2}$ and $V_{O3}$ from first, second and third DC output terminals 10, 11, 18, 19, 37 and 38 throughout the entire loaded and unloaded range to acquire ideal cross-regulation to all DC outputs. Further, electromagnetically close coupling established between second and third secondary windings 5c and 5f, enables uniformly induced voltage on each of second and third secondary windings 5c and 5f in response to associated number of turns in the windings 5c and 5f.

Embodiments of the present invention may be modified in various ways without limitation to the above first to third embodiments. By way of example, first to third embodiments exemplify converters of half-wave rectification type provided with secondary rectifying smoother 9, 17 and 36 each having a single output rectifying diode 7, 15 and 34 and a single output smoothing capacitor 8, 16 and 35, however, instead, they may be of two-wave rectification or full-wave rectification of bridge type, or combination thereof. Also, in place of leakage inductance 5d in primary winding 5a of transformer 5 as a current resonance inductance used in first to third embodiments, external reactive coil or coils can be connected in series to primary winding 5a of transformer 5 in case an additional inductance value is required. Further, in lieu of PWM (Pulse Width Modulation) control by frequency modulation to control the on-period of second primary MOS-FET 3 while the on-period of first primary MOS-FET 2 is set, switching frequencies of first and second primary MOS-FETs 2 and 3 may be made constant for fixed frequency while adjusting each of the on-periods for first and second primary MOS-FETs 2 and 3 for PWM control. Moreover, instead of first to third secondary windings 5b, 5c and 5f of transformer 5 for producing monopolar DC outputs $V_{O1}$, $V_{O2}$ and $V_{O3}$, the arrangement may otherwise be designed to take positive and negative DC outputs out of secondary windings 5b, 5c and 5f of transformer 5. Also, in place of parallel connection of second primary MOS-FET 3 with series circuit including current resonance capacitor 4, leakage inductance 5d and primary winding 5a of transformer 5, the series circuit may be connected in parallel to first primary MOS-FET 2. As a substitution of voltage pseudo resonance capacitor 6 connected between drain and source terminals of first primary MOS-FET 2, voltage pseudo resonance capacitor 6 may be connected between drain and source terminals of second primary MOS-FET 3, or similar capacitors may simultaneously be connected to both of first and second primary MOS-FETs 2 and 3 in a similar manner. Alternatively, a voltage pseudo resonance capacitor may coincidentally be served by parasitic capacitance formed between drain and source terminals of each of first and second primary MOS-FETs 2 and 3. Without limitation to first, second and third embodiments of the invention having two and three DC outputs, the invention may be applied to DC-DC converters of more than four DC outputs.

As mentioned above, the present invention can repress or control increase in DC outputs resulted from serge voltage which may occur under the light- or no-load condition without restricting electric power transmitted from the primary to the secondary side of transformer utilizing feedback control applied to primary control circuit. Accordingly, the converter can inhibit fluctuation in DC output voltage caused by serge voltage during the light-loading or unloading to generate a plurality of stable DC outputs throughout the whole load area.

What is claimed are:

1. A DC-DC converter of multi-output type comprising:
first and second primary switching elements connected in series to a DC power source;
a first rectifying smoother connected to a first secondary winding of a transformer;
a primary control circuit for controlling on-off operation of said first and second primary switching elements based on output voltage from said first rectifying smoother;
a second rectifying smoother connected to a second secondary winding of said transformer;
a secondary switching element connected between said second secondary winding and a smoothing capacitor of said second rectifying smoother;
a secondary control circuit for controlling on-off operation of said secondary switching element based on second output voltage from said smoothing capacitor;
wherein on-off operation of said first and second primary switching elements generates first and second DC outputs which is taken respectively from said first and second secondary windings of the transformer through said first and second rectifying smoothers;
said secondary switching element is turned on the moment the first or second primary switching element is turned on or when a predetermined period of time elapses after said first or second primary switching element is turned on;
said first secondary winding, primary winding, and second secondary winding in the one outward order or said second secondary winding, primary winding, and first secondary winding in the other outward order are concentrically wound in around a core in a layered structure, and
said first and second secondary windings of the transformer are in the electromagnetic sparse coupling,
PWM control is performed by frequency modulation to control the on-period of the first or second primary switching element while the on-period of the second or first primary switching element is set.

2. A DC-DC converter of multi-output type of claim 1, wherein said first and second secondary windings of the transformer are wound around a core together with the primary winding of said transformer between said first and second secondary windings.

3. A DC-DC converter of multi-output type of claim 1, wherein switching frequencies of the first and second primary switching elements are made constant for fixed frequency while adjusting each of the on-periods for first and second primary switching elements for PWM control.

4. A DC-DC converter of multi-output type of claim 1, further comprising:
a series circuit which includes a current resonance capacitor, an inductance and a primary winding of said transformer connected in series to one another and in parallel to said first or second switching element.

5. A DC-DC converter of multi-output type of claim 4, wherein the on-period ratio of the first and second switching elements is varied to adjust charged voltage of the current resonance capacitor for control of voltage applied on the primary winding of the transformer so that the first DC output voltage from the first DC output terminals can be appropriately regulated.

6. A DC-DC converter of multi-output type of claim 1, further comprising:
a third secondary winding in the transformer; a third rectifying smoother connected to the third secondary winding; an additional output switching element connected to the third rectifying smoother; and an additional secondary control circuit connected to third DC output terminals and additional output switching element for controlling the on-off operation of additional output switching element based on the level of a third output voltage applied on the third rectifying smoother, wherein on-off operation of said first and second primary switching elements generates first, second and third DC outputs which is taken respectively from said first, second and third secondary windings of the transformer through said first, second and third rectifying smoothers;

said additional output switching element is turned on the moment the first or second primary switching element is turned on or when a predetermined period of time elapses after said first or second primary switching element is turned on;

said first secondary winding, primary winding, and second and third secondary windings are concentrically wound in the outward order around a core in a layered structure; and the electromagnetic sparse coupling is formed between said first and second secondary windings and between said first and third secondary windings of the transformer.

7. A DC-DC converter of multi-output type of claim 6, wherein electromagnetically close coupling is established between the second and third secondary windings disposed adjacently to each other.

8. A DC-DC converter of multi-output type of claim 6, further comprising a barrier tape positioned in a space between said second and third secondary windings and which are separated from each other in an axial direction of the core.

9. A DC-DC converter of multi-output type of claim 6, further wherein the primary winding is wound around legs in a gap or space between first secondary winding and second and third secondary windings to reduce the magnetic flux interlinkage number and thereby accomplish the mutual electromagnetic sparse coupling between the first and second secondary windings and between the first and third secondary windings.

* * * * *